US006602060B2

(12) United States Patent
Zebuhr

(10) Patent No.: US 6,602,060 B2
(45) Date of Patent: Aug. 5, 2003

(54) COMPRESSOR EMPLOYING PISTON-RING CHECK VALVES

(75) Inventor: William H. Zebuhr, Nashua, NH (US)

(73) Assignee: Ovation Products Corporation, Nashua, NH (US)

( * ) Notice: Subject to any disclaimer, the term of this patent is extended or adjusted under 35 U.S.C. 154(b) by 22 days.

(21) Appl. No.: 10/002,912

(22) Filed: Nov. 30, 2001

(65) Prior Publication Data

US 2002/0037224 A1 Mar. 28, 2002

Related U.S. Application Data

(63) Continuation-in-part of application No. 09/765,263, filed on Jan. 18, 2001, and a continuation-in-part of application No. 09/209,947, filed on Dec. 11, 1998, now abandoned.

(51) Int. Cl.$^7$ ............................ F04B 39/10; F04B 53/12
(52) U.S. Cl. .......................... 417/545; 417/259; 92/240
(58) Field of Search ................................ 417/545, 259, 417/549, 254, 553, 255, 550; 92/182, 240, 126; 277/168, 435; 73/1.19

(56) References Cited

U.S. PATENT DOCUMENTS

| 2,425,813 A | 8/1947 | Kuntz |
| 2,703,310 A | 3/1955 | Kretchmar |
| 2,899,366 A | 8/1959 | Hickman |
| 3,136,707 A | 6/1964 | Hickman |
| 3,721,346 A | 3/1973 | Lore et al. |
| 3,771,918 A | 11/1973 | Winter |
| 3,861,222 A | 1/1975 | Braun et al. |
| 3,864,252 A | 2/1975 | Morin et al. |
| 4,035,243 A | 7/1977 | Katz et al. |
| 4,105,371 A | 8/1978 | Savabe et al. |
| 4,125,946 A | 11/1978 | Prager |
| 4,129,014 A | 12/1978 | Chubb |
| 4,235,679 A | 11/1980 | Swaidan |
| 4,267,021 A | 5/1981 | Speros et al. |
| 4,307,997 A | 12/1981 | Richards et al. |
| 4,308,720 A | 1/1982 | Brandstadter |
| 4,369,633 A | 1/1983 | Snyder |

(List continued on next page.)

FOREIGN PATENT DOCUMENTS

| CH | 213478 A | 2/1941 | |
| DE | 714705 C | 11/1941 | |
| FR | 803938 A | 10/1936 | |
| GB | 263053 A | 12/1926 | |
| JP | 20011032935 | * 2/2001 | ............ F16J/9/16 |
| WO | WO 00/34656 A1 | 6/2000 | |

OTHER PUBLICATIONS

Yeaple, Franklin D., Fluid Power Design Handbook, 1984, pp. 131–133, Marcel Dekker, Inc., New York, New York.
What is . . . Distillation www.goodwaterco.com.
Butuzov, Pukhovoy and Rifert, *Experimental Determination of the Minimum Irrigation Density in a Thin–Film Rotating Disk Apparatus*, Fluid Mechanics—Soviet Research, vol. 5, No. 1, Jan.–Feb. 1976.

Primary Examiner—Teresa Walberg
Assistant Examiner—Leonid M Fastovsky
(74) Attorney, Agent, or Firm—Cesari and McKenna, LLP

(57) ABSTRACT

A reciprocating compressor (26) includes two pistons (56 and 58) driven in opposite directions in a piston chamber (54). As a piston is driven in the downstream, compression-stroke direction, pressure causes a piston ring (64 or 66) that seals against the piston-chamber wall to seal against the piston, too, and thereby prevent fluid flow from the piston's downstream side to its upstream side. When the piston is driven downstream, on the other hand, pressure keeps the piston ring spaced from the piston and thereby allows flow from the piston's upstream side to its downstream side. The piston rings thus act as check valves.

6 Claims, 8 Drawing Sheets

U.S. PATENT DOCUMENTS

| | | | |
|---|---|---|---|
| 4,390,322 A | 6/1983 | Budzich | |
| 4,413,474 A | 11/1983 | Moscrip | |
| 4,440,601 A | 4/1984 | Katz et al. | |
| 4,536,258 A | 8/1985 | Huhta-Kolvisto | |
| 4,671,856 A | 6/1987 | Sears | |
| 4,734,167 A | 3/1988 | Goeldner | |
| 4,787,823 A | 11/1988 | Hultman | |
| 4,792,289 A | 12/1988 | Nieratschker | |
| 4,832,578 A | 5/1989 | Putt | |
| 4,878,819 A | 11/1989 | Bozoyan | |
| 4,909,716 A | 3/1990 | Orosz | |
| 5,016,524 A * | 5/1991 | Kawai et al. | 92/182 |
| 5,045,155 A | 9/1991 | Ramsland | |
| 5,050,892 A * | 9/1991 | Kawai et al. | 277/168 |
| 5,117,742 A * | 6/1992 | Iida | 92/126 |
| 5,171,135 A * | 12/1992 | Gannaway et al. | 417/550 |
| 5,483,929 A | 1/1996 | Kuhn et al. | |
| 5,533,358 A | 7/1996 | Crandall et al. | |
| 5,613,837 A * | 3/1997 | Konishi et al. | 417/255 |
| 5,628,879 A | 5/1997 | Woodruff | |
| 5,638,736 A | 6/1997 | Murakami et al. | |
| 5,720,177 A | 2/1998 | Derrick et al. | |
| 5,810,975 A | 9/1998 | Bourdel | |
| 5,818,131 A | 10/1998 | Zhang | |
| 5,983,845 A | 11/1999 | Yanagslawa | |
| 6,015,270 A * | 1/2000 | Roth | 417/259 |
| 6,120,266 A * | 9/2000 | Teck | 417/553 |
| 6,183,211 B1 * | 2/2001 | Wood | 417/254 |
| 6,193,482 B1 * | 2/2001 | Chen | 417/549 |
| 6,328,536 B1 * | 12/2001 | Zebuhr | 417/259 |
| 6,349,630 B1 * | 2/2002 | Wood | 92/240 |
| 6,427,517 B1 * | 8/2002 | McMillan | 73/1.19 |
| 6,428,014 B2 * | 8/2002 | Scarlett | 277/435 |

\* cited by examiner

COMPRESSOR EMPLOYING PISTON-RING CHECK VALVES

CROSS-REFERENCE TO RELATED APPLICATIONS

The present application is a continuation-in-part of commonly assigned copending U.S. patent application Ser. Nos. 09/209,947, which was filed on Dec. 11, 1998, now abandoned, by William H. Zebuhr for a Reciprocating Low Pressure Ratio Compressor, and 09/765,263, which was filed on Jan. 18, 2001, by William H. Zebuhr for a Distiller Employing Cyclical Evaporation-Surface Wetting, both of which are hereby incorporated by reference.

BACKGROUND OF THE INVENTION

1. Field of the Invention

The present invention relates generally to fluid compressors. It has particular, but not exclusive, application to compressors used for low-compression-ratio vapor compression.

2. Background Information

Among the many systems that use fluid compressors are vapor-compression distillers. Vapor-compression distillers generally make use of centrifugal compression because of its simplicity, cost-effectiveness, and reasonable efficiency. But that efficiency tends to degrade as distiller capacity is scaled downward. Below, say, 25 gallons of distillate per hour, efficiency considerations tend to favor reciprocating compressors, at least theoretically.

All other factors being equal, a lower compression ratio makes a vapor-compression distiller more efficient. But a reciprocating compressor's complexity tends to introduce efficiency-compromising factors such as leakage paths and the energy expense associated with check-valve operation.

SUMMARY OF THE INVENTION

I have found a way of reducing these effects and thus contributing to a reciprocating compressor's efficiency. According to my invention, piston rings mounted on the compressor's pistons seal to the wall of the piston chamber, as is normal for piston rings, but the rings are free to move axially with respect to their respective pistons to some extent. The piston rings are arranged so that the across-the-piston pressure difference that results when the piston is driven in the downstream direction tends to move the piston ring axially into a position in which it additionally seals to the piston. It thus becomes relatively effective at driving fluid in the downstream direction and thereby compressing it. When the piston moves in the upstream direction, though, the piston ring tends to be come unseated from the piston and thereby leave a fluid path around it.

In short, the piston ring additionally acts as a check valve. This eliminates not only the need for a separate check valve but also the need for the springs that check valves typically include. Since the same element serves as both the check valve and the piston ring, there is less opportunity for leakage flow than there would be in systems that employ separate elements. The invention thus contributes to efficiency and mechanical simplicity.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
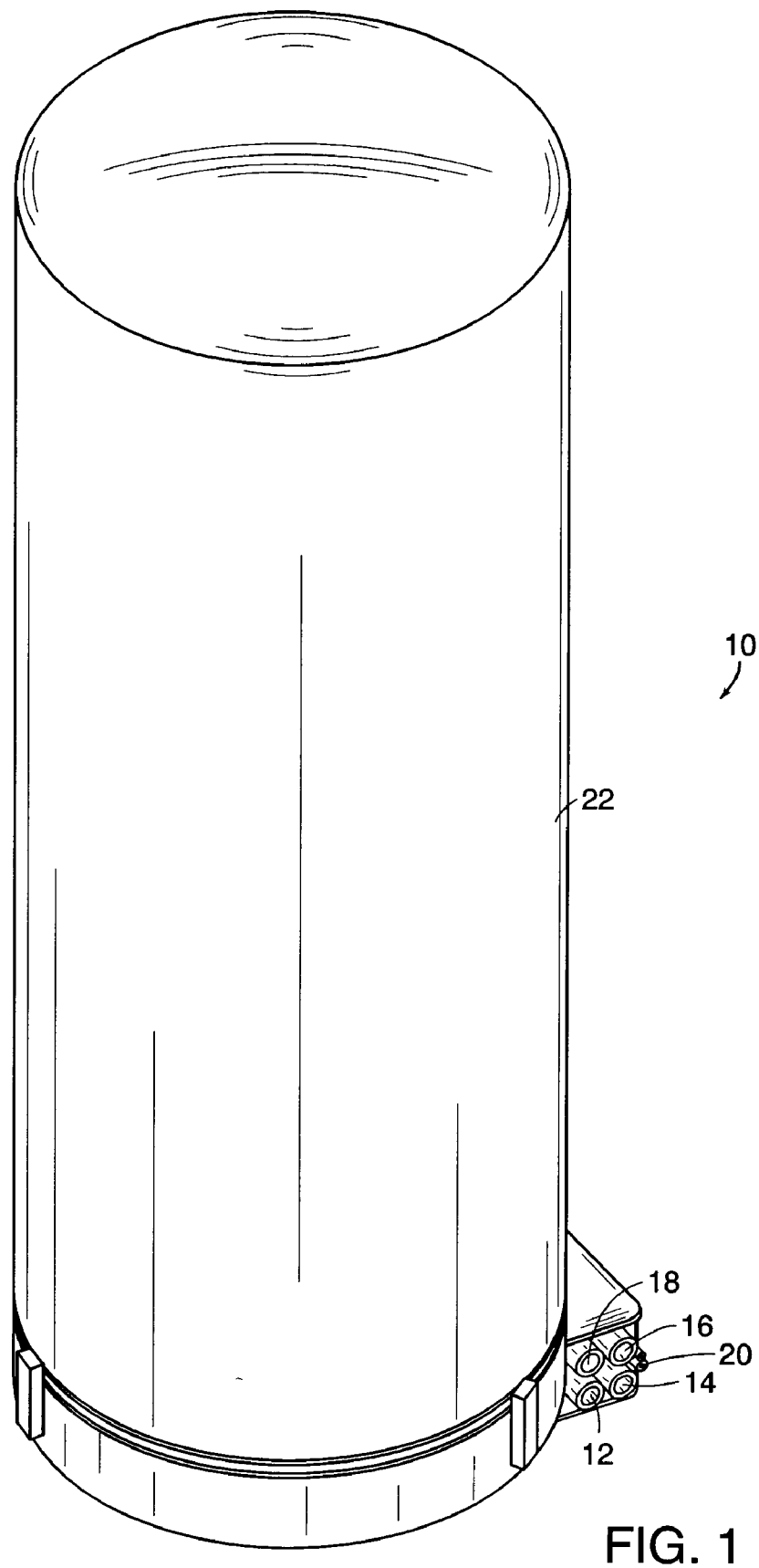
FIG. 1 is an isometric view of a distiller in which a compressor that embodies the present invention is included.

FIG. 1 is an exterior isometric view of a distillation unit 10 in which a compressor employing the present invention's teachings can be employed. The distillation unit 10 includes a feed inlet 12 through which the unit draws a feed liquid to be purified, typically water containing some contamination. The unit 10 purifies the water, producing a pure condensate at a condensate outlet 14. The volume rate at which condensate is produced at the outlet 14 will in most cases be only slightly less than that at which feed liquid enters inlet 12, nearly all the remainder being a small stream of concentrated impurities discharged through a concentrate outlet 16. The unit also may include a safety-drain outlet 18.

Since the illustrated unit is powered by electricity and may be remotely controlled or monitored, the drawing also includes electrical cables 20. And it depicts the unit as including an insulating housing 22, which some units intended for high-efficiency use may employ.

Figure 2:
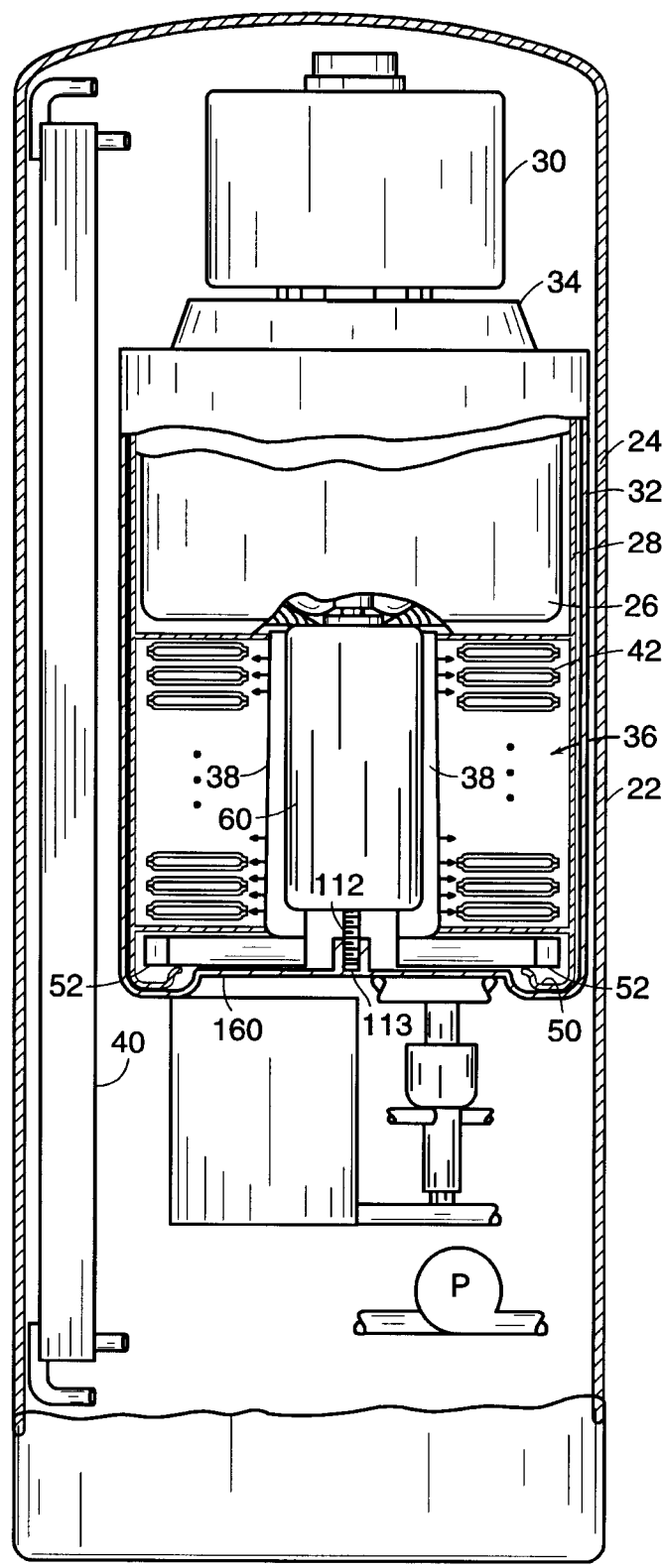
FIG. 2 is a vertical cross-sectional view of the distiller.

FIG. 2 is a simplified cross-sectional view of the distillation unit. It depicts the housing 22 as having a single-layer wall 24. In single-layer arrangements, the wall is preferably made of low-thermal-conductivity material. Alternatively, it may be a double-layer structure in which the layers are separated by insulating space. The compressor 26 that exemplifies the present invention is disposed in an assembly that rotates during operation and includes a generally cylindrical shell 28 driven by a motor 30. The rotating assembly's shell 28 is disposed inside a stationary vapor-chamber housing 32 on which is mounted a gear housing 34. That housing supports the motor 30 and encloses a drive train that drives the shell 28 and thus the entire rotating assembly. The vapor-chamber housing 32 in turn rests in a support omitted from the drawing for the sake of simplicity.

Figure 3:
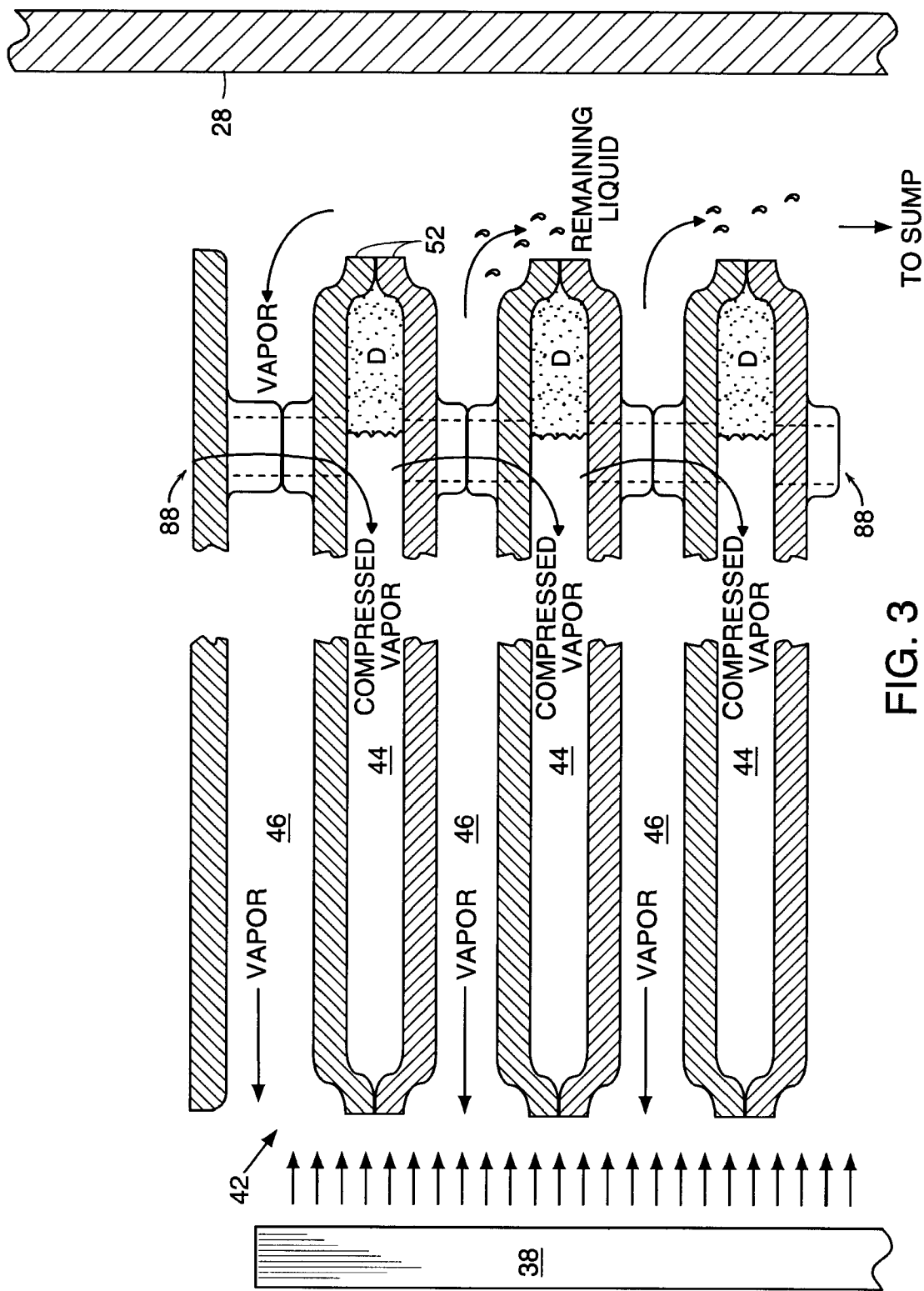
FIG. 3 is a more-detailed cross-sectional view of some of the distiller's heat-transfer plates.

The compressor 26's purpose is to provide a small pressure difference across a rotary heat exchanger 36, which is also part of the rotating assembly. Stationary sprayers 38 direct water to be purified, which has been preheated by a counterflow heat exchanger 40, onto the heat exchanger's plurality of stacked annular plates 42. Plates 42 spin about their axes as part of the rotating assembly. FIG. 3, which depicts the heat exchanger's radially inward part on the left and the radially outward part on the right, shows that successive plates form enclosed condensation chambers 44 interspersed with open evaporation chambers 46.

As will be explained in more detail below, the condensation chambers 44 contain vapor that the compressor has pressurized. The evaporation chambers 46, on the other hand, communicate with the compressor's inlet, which draws vapor from the evaporation chambers through the radially inward void that the plates 42 define. As a consequence, the vapor pressure that prevails in the evaporation chambers is lower than the vapor pressure that prevails in the condensation chambers. This means that the boiling point is higher in the condensation chambers than in the evaporation chambers, and the plates 42 therefore transfer heat from the condensation chambers' condensing vapor to the thereby evaporating water in the evaporation chambers, and the compressor draws in the resultant evaporation-chamber vapor.

The water that has thereby condensed in the condensation chambers is removed, as will be explained in more detail below, and it issues from the distiller's outlet 14 (FIG. 1) as its (purified) output after flowing through the counterflow heat exchanger 40 (FIG. 2) to preheat the inlet water. Centrifugal force drives toward the shell 28's inner surface evaporation-chamber water that has not evaporated, and this water flows to a rotating sump 50. There the water's kinetic energy drives it through stationary scoops 52 for recirculation back to the sprayers 38.

Figure 4:
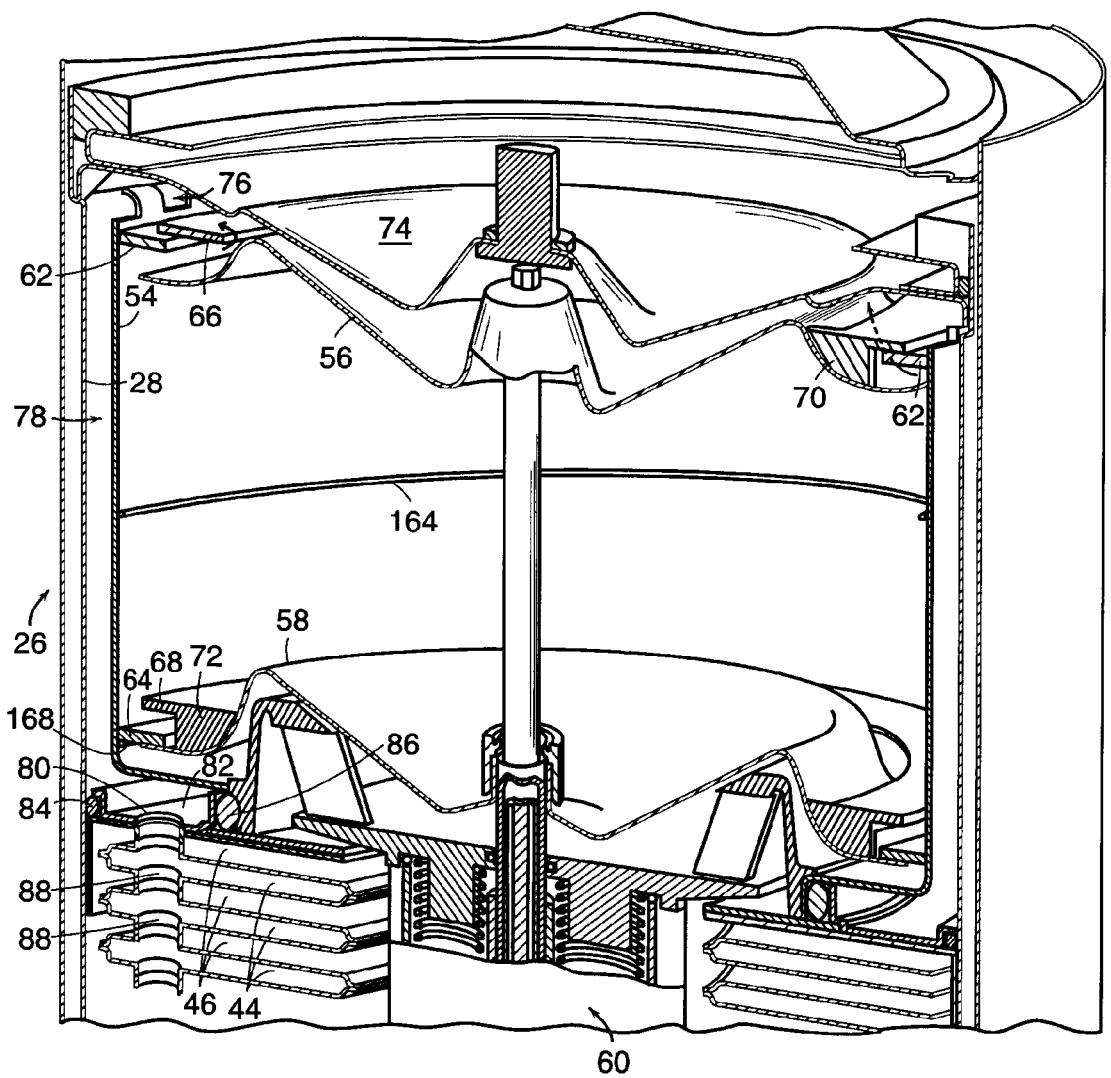
FIG. 4 is an isometric cut-away view of the compressor.

FIG. 4 depicts compressor 26 in more detail. The compressor includes a (spinning) compressor cylinder 54 within which two pistons 56 and 58, which spin with the compressor cylinder, are caused to reciprocate out of phase with each other by a rotation-to-reciprocation converter 60 described below. The directions of piston travel are parallel to the rotating assembly's rotational axis, so Coriolis forces are essentially avoided. Also, the pistons' centers of mass are disposed on the rotational axis, and this tends to minimize vibration. As a piston rises, its respective piston ring 62 or 64 forms a seal between the piston and the compressor cylinder 54's inner surface and thereby prevents vapor from flowing from the piston's downstream side to its upstream side. The piston therefore draws vapor from the heat exchanger's central region. As a piston travels downward, on the other hand, its respective piston ring tends to lift off the piston surface and thereby break the seal between the cylinder wall and the piston. Annular piston-ring retainers 66 and 68, which respective struts 70 and 72 secure to respective pistons 56 and 58, drag respective piston rings 62 and 64 downward after the seal has been broken. The piston rings and stops thus leave clearances that permit vapor flow past the downward-moving pistons. In the illustrated embodiment, each piston ring's area exceeds one-quarter of the piston chamber's area, so the piston rings can leave large, low-flow-resistance openings in their downstream positions.

Of course, permit and prevent are relative terms in this context; practical embodiments will not seal perfectly, so there is some minuscule flow past a piston even when its piston ring is "sealed" against it. But the piston and ring will be so designed as to present at least an order of magnitude greater flow resistance when the piston travels downstream than when it travels upstream, so an upstream (here, downward)-moving piston does not urge the vapor back upstream as effectively as a downstream (here, upward)-moving piston draws it upward. The piston rings thus double as check valves, eliminating the need for separate check valves and the additional leakage paths to which they inevitably give rise. As will be explained below, the pistons' reciprocation is so phased that there is always one piston moving upward, and thereby effectively drawing the vapor upward, while the other is returning downward.

For reasons that will become apparent directly, the vapor that the pistons 56 and 58 have driven upward cannot pass upward beyond the compressor's cylinder head 74. But slots 76 formed in the compressor wall's upper lip provide paths by which the vapor thus drawn from the heat exchanger's central region can be driven down through an annular passage 78 formed between the compressor cylinder 54's outer surface and the rotating-assembly shell 28. This passage leads to openings 80 in an annular cover plate 82 sealed by O-rings 84 and 86 between the compressor cylinder 54 and the rotating-assembly shell 28. The openings 80 register with openings 88 in the heat-exchanger plates 42 that form passages between the condensation chambers 44 (FIG. 3).

In short, the compressor cylinder 54, the cylinder head 74, and the rotating-assembly shell 28 cooperate to form a guide that directs vapor along a vapor path from the evaporation chambers 46 to the condensation chambers 44. And the compressor compresses the vapor that follows this path. As was observed above, therefore, the vapor pressure is higher in the condensation chambers 44 than in the evaporation chambers 46. Note also that the seals between the compressor and heat exchanger are simple O-ring seals 84 and 86; because the compressor and heat exchanger rotate together, the complexity of employing rotary seals for this purpose is avoided, as is the attendant power loss.

Figure 5:
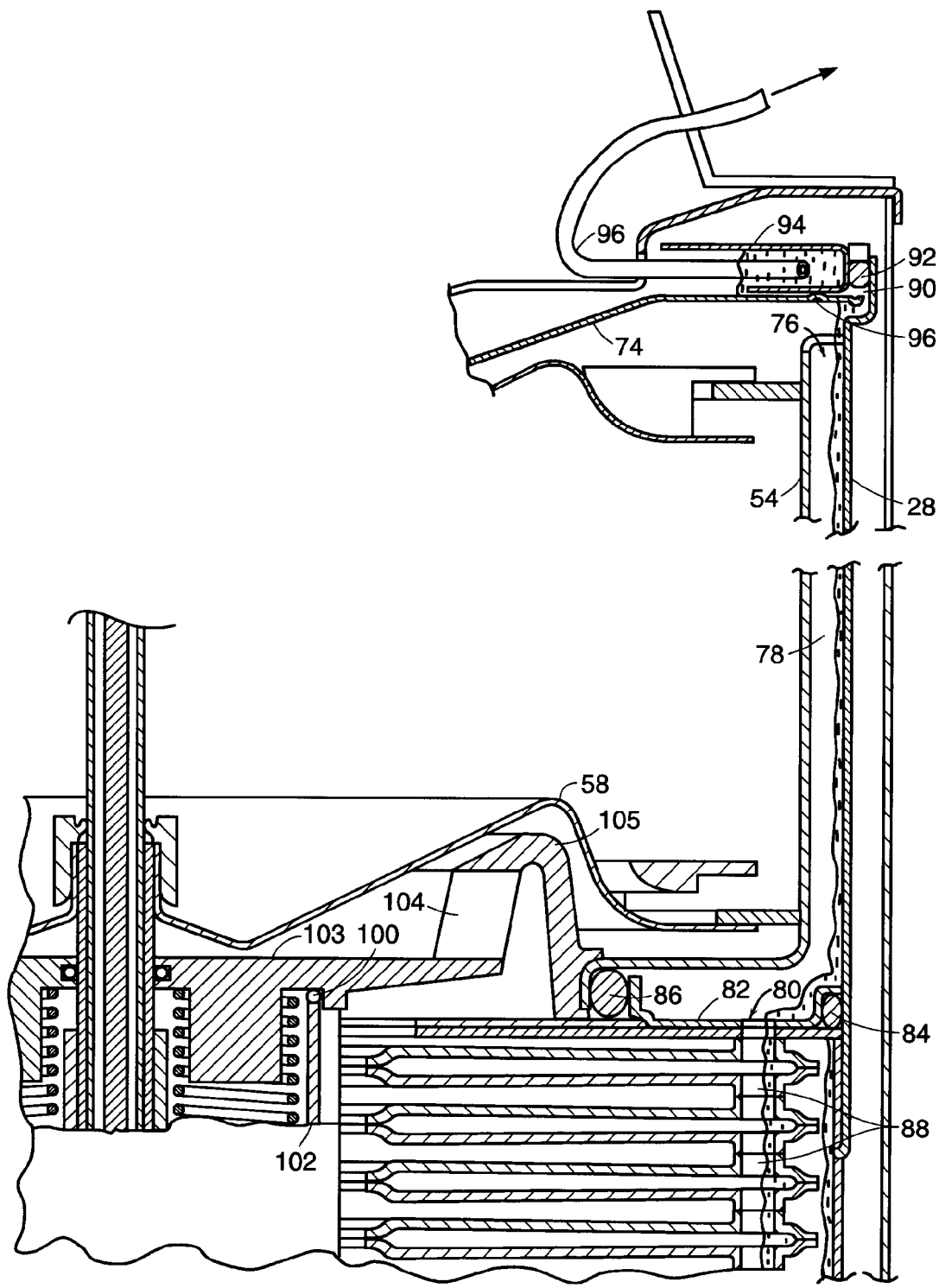
FIG. 5 is a detailed cross section depicting the distiller's compressed-vapor return path.

In the illustrated embodiment, the rotating assembly rotates at a relatively high rate, say, 700 to 1000 rpm. The resultant centrifugal force causes the now-purified condensate to collect in the outer perimeters of the condensation chambers, between which it can flow through the passages that the heat-exchanger-plate openings 88 form. As FIG. 5 shows, the condensate therefore flows out through the openings 80 in the top of the heat exchanger and travels along the channel 78 by which the compressed vapor flowed into the heat exchanger.

Like the compressed vapor, the condensate can flow through the openings 76 in the compressor wall's lip. But the condensate can also flow past the cylinder head 74 because of a clearance 90 between the cylinder head 74 and the rotating-assembly shell 28, whereas the condensate's presence in that clearance prevents the compressed vapor from similarly flowing past the cylinder head. An O-ring 92 seals between the rotating-assembly shell 28 and a rotating annular channel-forming member 94 secured to the cylinder head 74, but spaced-apart bosses 96 formed in the cylinder head 74 provide clearance between the cylinder head and the channel member so that the condensate, urged by the pressure difference that the compressor imposes, can flow inward and into channel-forming member 94's interior.

Like the cylinder head 74 to which it is secured, the channel-forming member 94 spins with the rotary heat exchanger. So centrifugal force causes the purified condensate that it contains to collect in the channel's radially outward extremity. The spinning condensate's kinetic energy drives it into a stationary scoop tube 96, from which it flows to FIG. 1's condensate outlet 14 by way of a route that includes FIG. 2's counterflow heat exchanger 40.

We now turn to a description of the compressor driver. The particular type of driver used to cause piston reciprocation is not critical to the present invention, and a conventional crankshaft/piston-rod approach could be employed. But I prefer a driver that results in less pressure pulse and, in contrast to crankshaft arrangements, applies essentially only axial forces to the piston; a driver that applies essentially only axial forces tends to cause less piston-ring friction and thus allows greater flexibility in piston-ring design. The illustrated embodiment's example of such a driver includes the motor 30, a gear train enclosed within the gear housing 34, the rotating-assembly shell 28, which the motor drives through the gear train, and the rotation-to-reciprocation converter 60.

Figure 6:
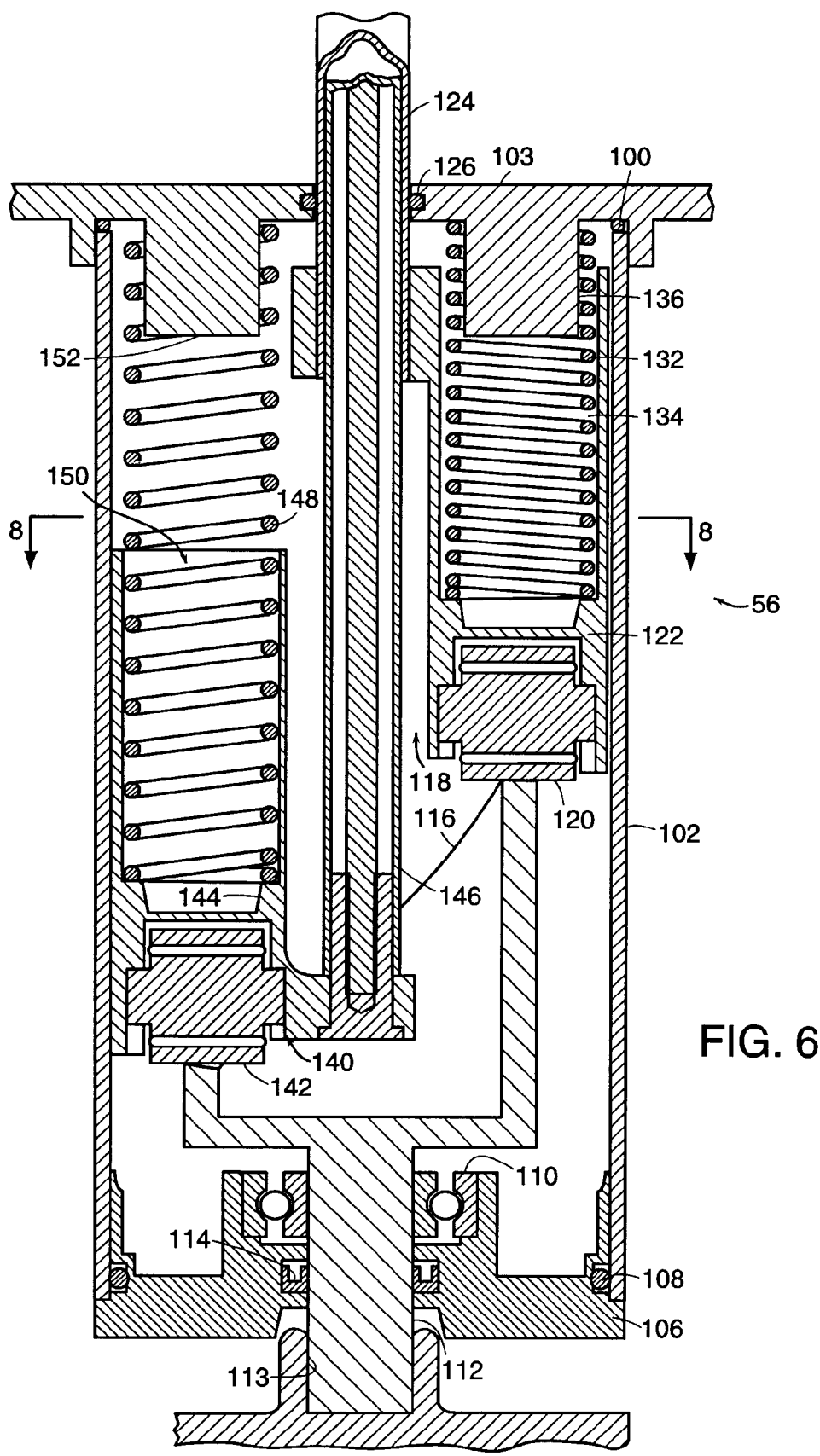
FIG. 6 is a cross-sectional view, with parts removed, of a cam/follower assembly included in the compressor driver.
Figure 7:
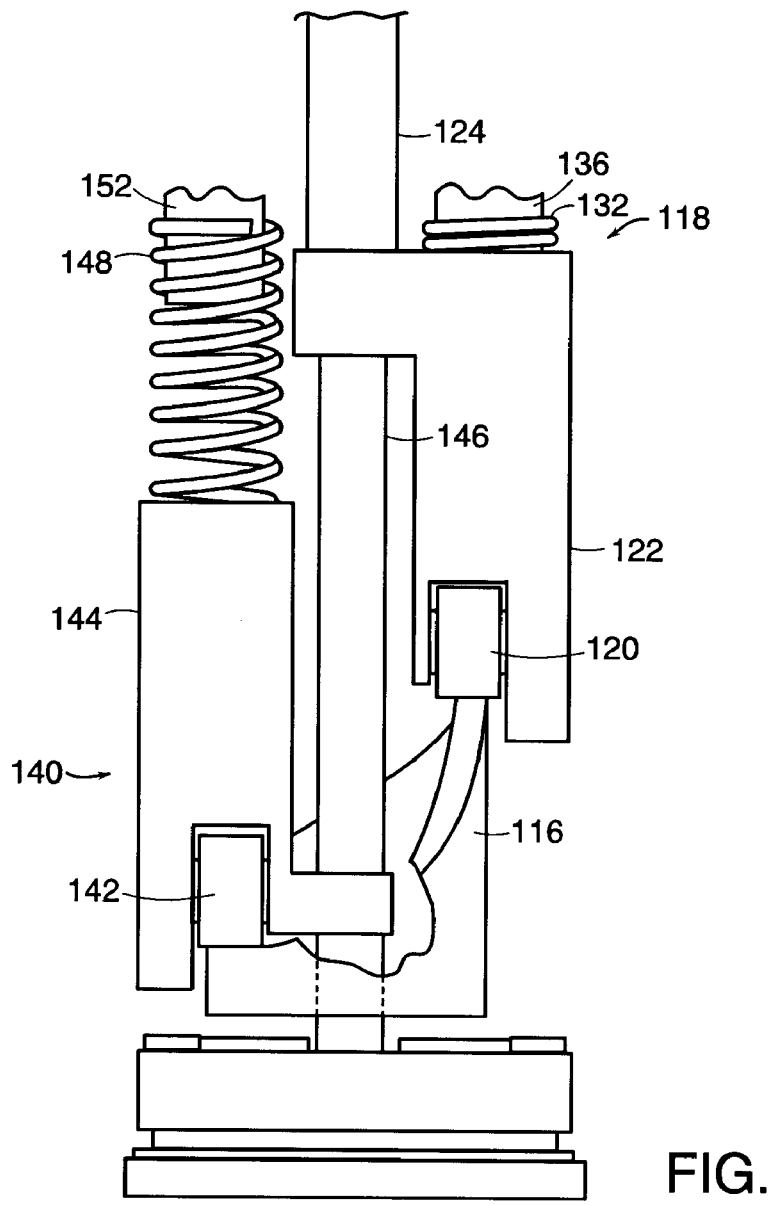
FIG. 7 is a partially cut-away vertical elevation of the cam/follower assembly with parts removed.
Figure 8:
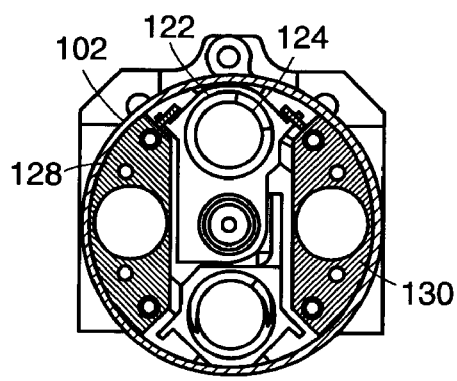
FIG. 8 is a cross-sectional view of a cam/follower assembly taken at line 8—8 of FIG. 6.

FIGS. 6, 7, and 8 show that the rotation-to-reciprocation converter takes the form of a cam/follower mechanism. An O-ring 100 shown in FIG. 6 seals a cylindrical cam-mechanism housing 102 to the hub portion 103 of a generally annular cam-mechanism cap. As FIG. 5 shows, hub portion 103 is coupled by the cap's spokes 104 and rim 105 through the cover plate 82 to the rotating-assembly shell 28. The cap therefore undergoes rotation, which it imparts to the cam-mechanism housing 102 and thereby also to a generally circular end piece 106 (FIG. 6) secured in the cam-mechanism housing 102 and sealed to it by an O-ring 108. The end piece 106 and housing 102 are held in position by a bearing 110 mounted on a stationary camshaft 112 secured in a pocket 113 of the vapor-chamber housing 32 shown in FIG. 2. A lip seal 114 seals the end piece 106 to the camshaft 112, on whose upper end a (stationary) cam 116 is formed.

FIG. 7 is a simplified elevational view of the cam/follower mechanism with the cap 104 and housing 102 removed and the cam 116 partially broken away. It shows that a first cam follower 118 includes a roller bearing 120 and a slider 122, in which the roller bearing 120 is rotatably mounted. A lower-piston rod 124 is secured to the slider 122 and, as FIG. 6 shows, extends through a central aperture in the cam-mechanism cap's hub portion 103, to which an O-ring 126 seals it. FIG. 8 shows guides 128 and 130, omitted for the sake of simplicity from FIGS. 6 and 7, that are mounted on the housing 102. The guides permit the slider to slide axially of the housing but keep it in a fixed angular position with respect thereto so that the slider orbits the housing axis as the housing rotates. A bias spring 132 disposed in the slider 122's central aperture 134 (FIG. 6) and positioned by a spring guide 136 formed by the cap hub portion 103 so acts between the cap and the slider 122 as to bias the roller bearing 120 against the cam 116's cam surface. Since the cam is stationary and the roller bearing 120 orbits the housing axis with the slider 122, the slider reciprocates axially and thereby causes reciprocation of the piston rod 124 and thus of the piston 58 (FIG. 4) secured to it.

Of course, the piston can be driven in ways that do not employ the rotating assembly's source of rotation. Even in drivers that do employ rotation-to-reciprocation converters, converters other than cam/follower arrangements can be used, although I prefer the cam/follower approach. And cam/follower assemblies themselves can differ considerably from the illustrated type. The profile-providing cam can be provided in the rotating assembly, for example, while the non-profiled "follower" can be stationary. And, even if the cam follower is disposed on the rotating assembly, it may not undergo only translational motion, as the illustrated follower does; it could be so mounted as to pivot, for example. So piston drive can be provided in many ways.

To drive the upper piston, the drive mechanism includes a second cam follower 140. It similarly includes a second roller bearing 142 and a second slider 144, on which bearing 142 is rotatably mounted. An upper-piston rod 146 extending through the lower-piston rod 124's central bore is secured at opposite ends to the second slider 144 and the upper piston 56. A second bias spring 148 disposed in the second slider 144's central aperture 150 and positioned by a second spring guide 152 formed on the cap's hub portion 103 similarly acts between the cap and the second slider 144 to bias the second roller bearing 142 against the cam 116's cam surface. So the upper piston 56 is driven to reciprocate, as the lower piston 58 is. Since the second cam follower's position on the cam 116 is diametrically opposite that of the first cam follower, though, the upper piston's reciprocation is 180° out of phase with that of the lower piston.

Figure 9:
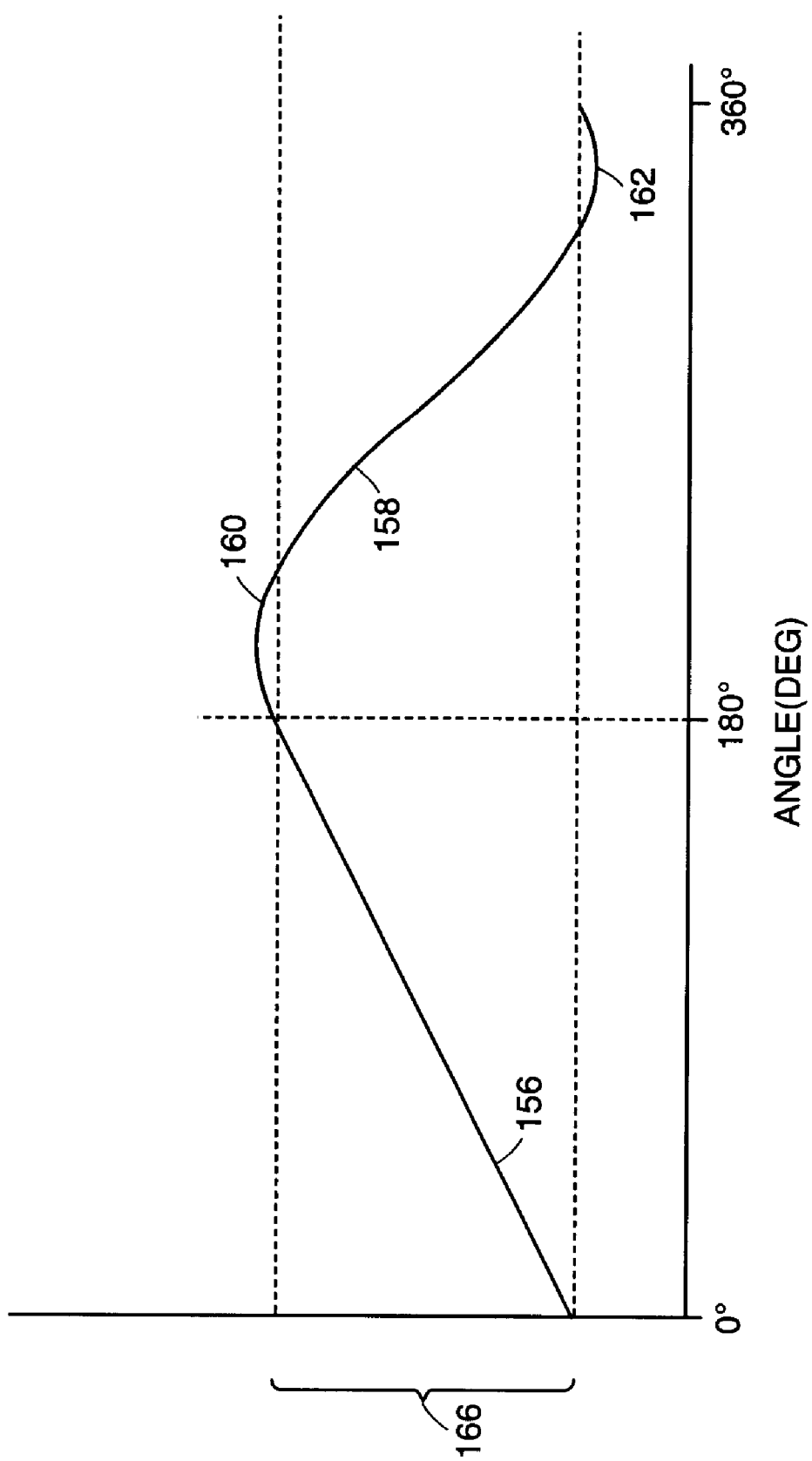
FIG. 9 is a profile diagram of the cam/follower assembly's cam.

What this means is best appreciated considering FIG. 9, which is a plot of the cam 116's profile. That profile is so designed as to keep the compression stroke's speed constant and eliminate any significant period in which neither piston is moving upward. As the cam follower traverses the cam section represented by linear profile portion 156, it drives the piston downstream, i.e., in a compression stroke. Because that cam position's profile is linear, the piston's speed is constant during this interval if the rotating assembly's rotational speed is. To make sure that there is always at least one piston that is in this linear compression region, that region should span at least 180° of the cam's profile (or, if there are more than two pistons, at least 360°/N, where N is the number of pistons); the drawing illustrates it as spanning 180°. A return portion 158 and two reversing portions 160 and 162 make up the remaining 180° of the cam profile in that drawing.

Now, consider the situation in which the lower piston is moving upward in the linear part of its compression stroke and the upper piston is moving downward. The pressure difference across the lower piston keeps the lower piston's piston ring sealed against the piston face and thereby acting as a closed check valve. Initially, flow resistance and friction conversely keep the upper piston's piston ring spaced from the piston face so that it acts as an open check valve. Before the lower piston reaches the end of its linear region, though, the upper piston reaches its position corresponding to cam portion 162, so it decelerates. Inertia would therefore tend to cause its piston ring to seal against it; i.e., its check valve would tend to close prematurely. This would cause a pulse in the compressor flow by closing the path from the lower, compressing piston to the compressor outlet before the upper piston has reached its linear compression stroke.

To prevent such an interruption, an annular stop identified in FIG. 4 by reference numeral 164 is formed on the compressor cylinder 54's inner surface in such a position as to prevent the upper piston ring 62 from sealing against the upper piston 56's face when that piston is significantly below its linear range, i.e., significantly below the range of upper-piston positions corresponding to FIG. 9's range 166. A similar stop 168 prevents the lower piston 58 from causing such an interruption.

Because it employs piston rings as check valves, a compressor that embodies the present invention's teachings is not only relatively simple to assemble but also omits some leakage paths that detract from the efficiency of more-conventional compressors. The present invention thus constitutes a significant advance in the art.

What is claimed is:

1. A compressor that forms a compressor inlet and compressor outlet, draws fluid in through the compressor inlet, compresses fluid thereby drawn thereinto, drives the fluid thus compressed from the compressor outlet, and includes:
   A) a piston-chamber wall that extends axially to define a piston chamber with which the compressor inlet and outlet communicate;
   B) at least one piston disposed within the piston chamber and axially slidable with respect to the piston-chamber walls;
   C) a piston driver that causes each piston to travel alternately in upstream and downstream directions; and
   D) a piston ring associated with each piston, forming a sliding seal with the piston-chamber wall, and retained on that piston for limited axial movement with respect thereto between an upstream position, in which it so seals against the downstream face of the piston with which it is associated as to cooperate therewith to prevent fluid flow between the portions of the piston chamber upstream and downstream of the piston, and a downstream position, in which it is so spaced from the downstream face of the piston with which it is associated as to leave a fluid-flow path by which the portions of the piston upstream and downstream of the piston communicate, whereby the piston tends to move through the fluid in the piston chamber when the piston is moving upstream but tends to compress fluid in the portion of the piston chamber downstream thereof when the piston is moving downstream.

2. A compressor as defined in claim 1 wherein each piston leaves between itself and the piston-chamber wall a clearance through which fluid can flow when the piston ring associated therewith is in its downstream position but not when it is in its upstream position.

3. A compressor as defined in claim 2 wherein the area of the piston ring is at least one-quarter of that of the piston chamber's cross section.

4. A compressor as defined in claim 1 wherein:

A) the compressor includes a plurality of said pistons; and

B) the piston driver drives each piston out of phase with at least one other said piston.

5. A compressor as defined in claim 1 further including a stop associated with at least one said piston ring and disposed in a position so fixed with respect to the piston chamber as to prevent the piston ring with which that stop is associated from traveling upstream far enough to seal against the piston with which that piston ring is associated when that piston is at the upstream end of its travel.

6. A compressor as defined in claim 1 further including at least one retainer associated with each piston, mounted thereon, and so positioned with respect thereto as to permit the relative motion of the piston ring associated therewith but to prevent relative downstream motion of that piston ring beyond its downstream position.

* * * * *